N. CZAJKOWSKI
O. THALMAN
INVENTOR

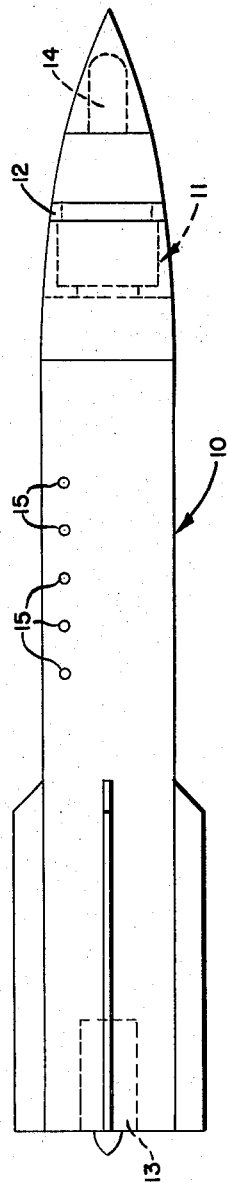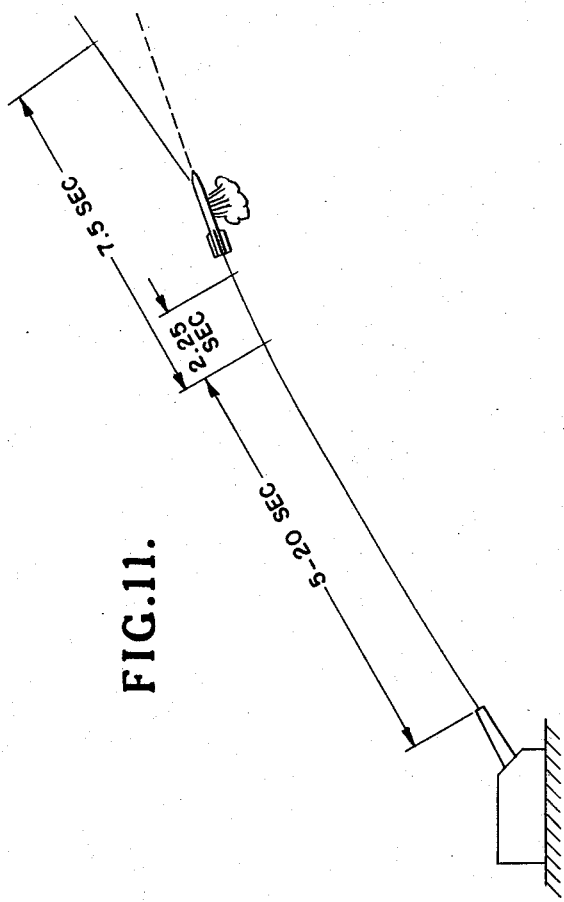

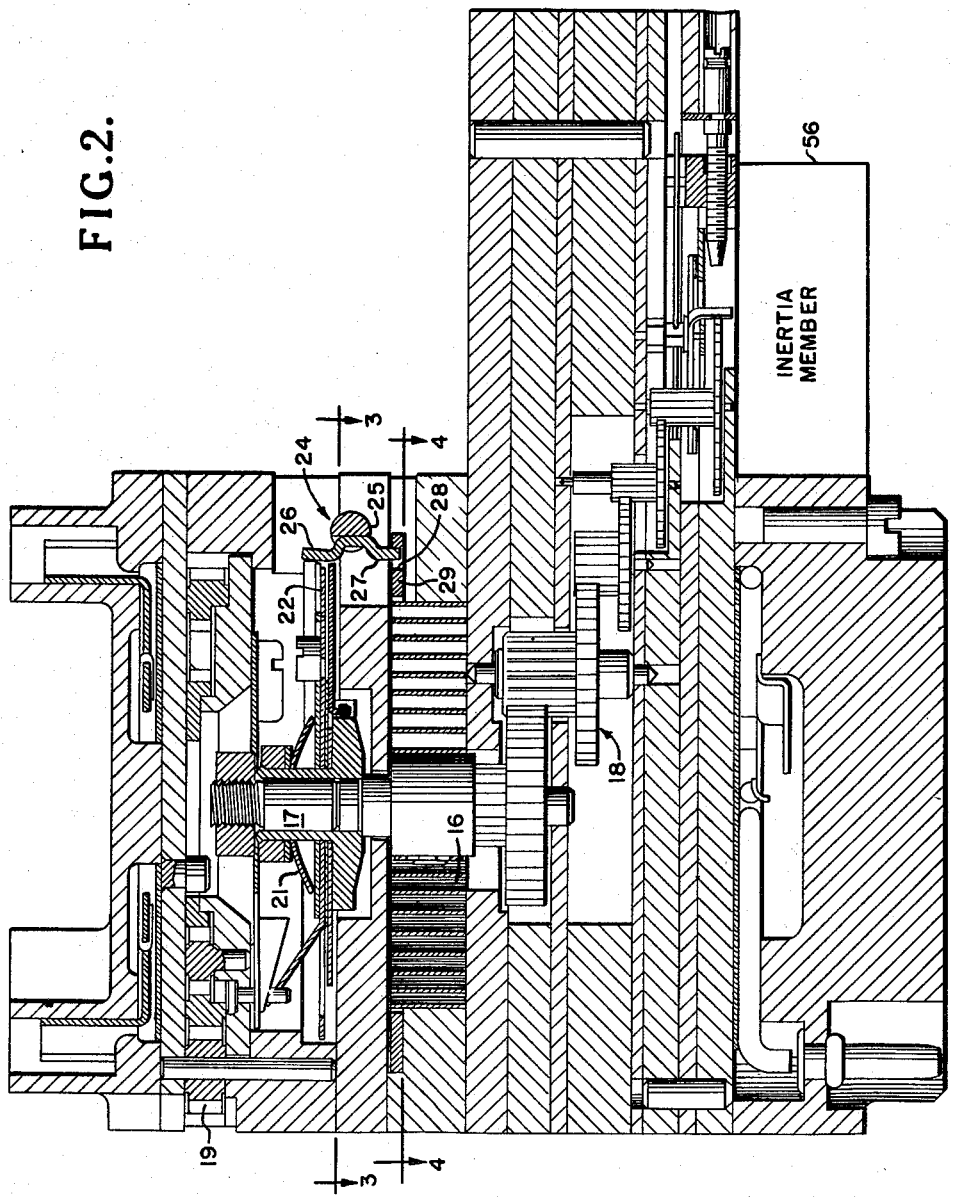

United States Patent Office 2,958,282
Patented Nov. 1, 1960

2,958,282

PROGRAMMING DEVICE FOR A PROJECTILE

Norman Czajkowski and Otto Thalman, Chevy Chase, Md., assignors to the United States of America as represented by the Secretary of the Navy Filed Nov. 14, 1956, Ser. No. 622,229

13 Claims. (Cl. 102—50)

(Granted under Title 35, U.S. Code (1952), sec. 266)

The invention described herein may be manufactured and used by or for the Government of the United States of America for governmental purposes without the payment of any royalties thereon or therefor.

This invention relates to a programming device for a projectile and more particularly to a spring driven mechanism for actuating a plurality of switches in successive order at the completion of predetermined intervals of time.

It has been the usual practice heretofore in devices of this character to provide a mechanism in which switches are actuated in sequential order during a single revolution of a cam in response to the movement of a cam follower as the follower engages the lobes and depressions of the cam surface during a single revolution thereof. When employed as a program device carried by a projectile in flight in which the switching operations to be performed occur during a substantial portion of the flight time, such devices have not proven altogether satisfactory for the reason that when used with projectiles of small caliber, the peripheral rate and movement of the cam is very slow and a considerable variation in the time intervals separating the various switching operations, therefore, exists by reason of variations in adjustments and manufacturing tolerances of the device.

The device of the present invention possesses all of the advantages of the prior art devices and none of the foregoing disadvantages. This desirable result is achieved by employing two revolutions of the cam for a cycle of switching operations and disabling all but one of the switching elements during the first revolution, as will more clearly appear as the description proceeds.

One of the objects is to provide a new and improved program device for a projectile in which a switching operation is achieved with a high degree of accuracy at the completion of a predetermined interval of time during one revolution of the switch actuating member and the other switching operations are performed in predetermined time sequence during a second revolution of the actuating member.

Another of the objects is to provide a programming device for performing a plurality of switching operations in predetermined time sequence in which all but one of the switches are disabled during a first revolution of the switch actuating means and in which new and improved means are provided for rendering said all but one switches effective for actuation during a second revolution of the switch actuating means.

Still another object resides in a spring driven program device set in operation by a set-back force applied thereto in which two revolutions of a cam actuating member are required to actuate a plurality of switches controlled thereby in predetermined timed sequence such that one switch is actuated during the first revolution and the remaining switches are actuated during the second revolution of the device.

A still further object resides in the provision of new and improved means for actuating a plurality of switching elements in predetermined time sequence in such manner that the switching devices are unlocked and actuated to an operating position and the movable switching element when moved to the actuated position locks the switch releasing member in a release position.

Still other objects, advantages and improvements will be apparent from the following description taken in connection with the accompanying drawings on which like numerals of reference are employed to designate like parts throughout the several views and of which:

Fig. 1 is a view of a projectile suitable for use with the device of the present invention on which is shown the means for adjusting the device to a predetermined time interval of operation of one of the switching elements;

Fig. 2 is a view partially broken away and partially in section of the program device of the instant invention according to a preferred embodiment thereof;

Fig. 11 is a diagrammatic view of the missile in flight.

Figure 3:
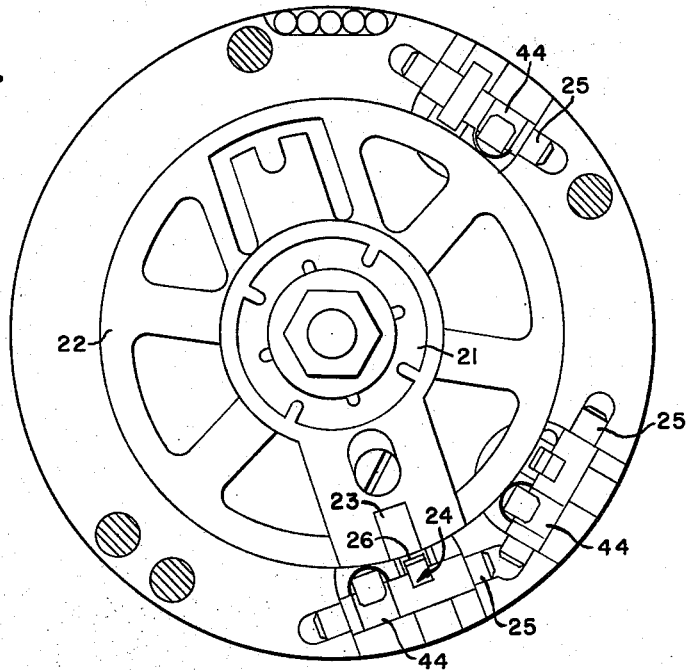
Fig. 3 is a view of the switch releasing cam mechanism taken substantially along the line 3—3 of Fig. 2 and showing a plurality of switch releasing devices controlled thereby.

Referring now to the drawings for more complete understanding of the invention and more particularly to Fig. 1 thereof there is shown thereon a projectile indicated generally by the numeral 10 within which is disposed the program device of the present invention generally indicated by the numeral 11 and having a setting ring 12 operatively connected thereto for establishing an operative connection between the device and the fuze setter for the projectile whereby the device may be set for operation of the first switching element thereof at a predetermined time interval after the projectile has been fired from a gun. The projectile may be of any type suitable for the purpose such, for example, as the type employing a proximity fuze 13 arranged within the tail portion thereof and connected to an electro-responsive detonator in a manner to explode the projectile within lethal range of a target, as is well known in the art to which this invention pertains. Within the nose of the projectile is disposed an oscillator 14 connected to a transmitting antenna so arranged as to project an asymmetrical type O radio pattern outwardly from the nose of the projectile as the oscillator is activated. There is also preferably provided a plurality of ports 15 arranged substantially as shown for deflecting the course of the projectile in response to a thrust received laterally by the projectile as an explosive disposed therein is fired and discharges through the ports, the force of this lateral thrust causing the projectile to change its course in accordance with the instant angular position thereof at the moment the charge is fired.

Referring now to Fig. 2 on which is shown an enlarged view of the program device 11 of Fig. 1, there is shown thereon a spring motor 16 adapted to rotate a shaft 17 when an escapement mechanism indicated generally by the numeral 18 connected thereto is set into operation by a set-back force acting on an inertia member 56. Movement of the inertia member causes the escapement to be unlocked and actuated by the spring motor 16.

Frictionally connected to the shaft 17 as by the spring washer 21 illustrated is a rotatable, circular timing disc 22, Figs. 2 and 3, having a notch 23 formed therein. The disc 22 is settable to any desired position with respect to the shaft 17 by the setting ring 12, Fig. 1, through gears 19 prior to discharge of the projectile from the gun. A plurality of cam releasing elements 24 are disposed about the periphery of disc 22, each of the elements being mounted for rotative movement by a shaft 25 to which the elements are secured. The upper end of each of the elements is formed as at 26 and provided with a cam surface for engagement with the circular periphery of the disc 22 and for entry into the notch 23 as the notch is moved opposite the cam surface. The lower end of the cam releasing element 24 is formed as at 27 for engagement with a notched portion 28 of locking ring 29, Fig. 4. It should be noted, however, that the first of the switches to be operated has associated therewith a cam releasing element 24 normally disposed within slot 31 of locking ring 29, Fig. 4, whereby the locking ring is prevented from moving to an unlocking position until the first switch has operated by entry of the portion 26 thereof into notch 23 of disc 22 during a first revolution of the timing disc. Ring 29 is mounted for rotative movement within member 32, rotative movement being applied thereto by a spring 33 and plunger 34 disposed within a tubular casing 35 in such a manner that one end of the plunger is in engagement with a tab 36 formed on ring 29 and the other end of the casing in engagement with a pin 37 secured to the member 32.

Rotative movement of disc 29 is arrested by pin 30 as portion 40 of recess 50 is brought thereagainst. When this occurs the remaining cam releasing elements 24 are unlocked and rendered effective for actuation by disc 22 as notch 23 thereof is brought into registered engagement therewith.

Figure 5:
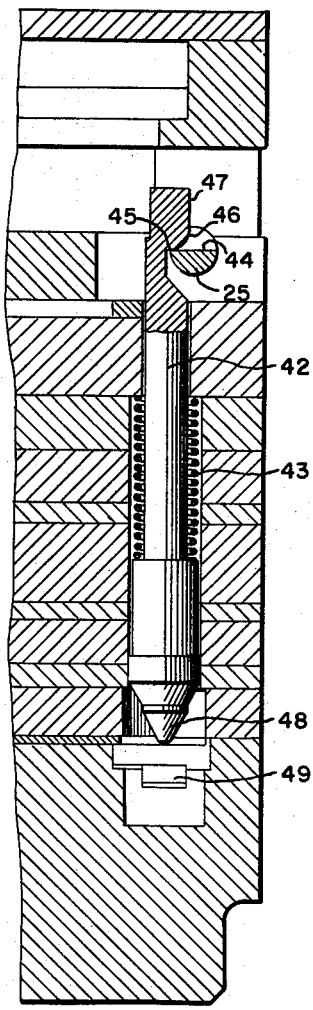
Fig. 5 is a view partly in section of one of the switches and the release mechanism therefor.

On Fig. 5 is shown one of the switch actuating plungers 42 yieldably urged to an actuated position by spring 43 but normally locked in an initial unactuated position by a flat cam surface 44 formed on the shaft 25 in engagement with a shoulder 45 formed on shaft 42 substantially as shown. Shoulder 45, it will be noted, is rounded at 46 whereby spring 43 imparts a torque to shaft 25 in a direction to move the upper portion of cam releasing element 24 inwardly toward disc 22 therein. As portion 26 of cam releasing element 24 engages notch 23 in disc 22, shaft 25 is rotated substantially 90 degrees releasing plunger 42 and actuating the switch. As the plunger moves to the actuated position, the cam surface 44 is brought into closely abutting relation with the upstanding portion 47 of plunger 42 thereby preventing further movement of the cam releasing element 24.

On Fig. 5 is shown a conical contacting surface 48 formed on the end of plunger 42 and adapted to close a circuit between two contact elements 49 and thereby perform a first switching operation.

Figure 6:
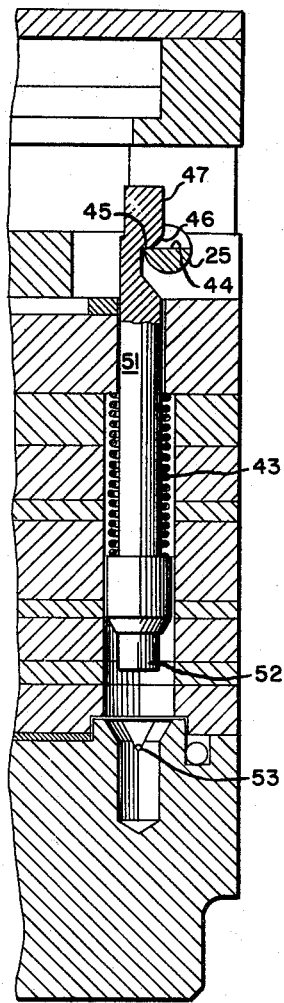
Fig. 6 is a view partly in section of another of the switches and the release mechanism therefor.
Figure 10:
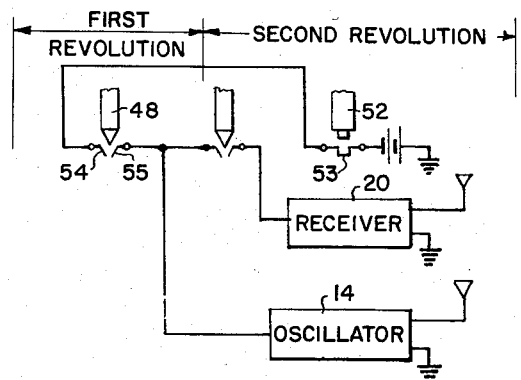
Fig. 10 is a circuit suitable for use with the program device of the present invention.

On Fig. 6 is shown the last of the switches to be actuated during the second revolution of the disc 22 as the notch 23 thereof moves into registry with the upstanding cam surface of the portion 26 of cam releasing element 24 associated therewith. The plunger 51 of Fig. 6 is generally similar to the plunger 42 and is unlocked in the same manner as plunger 42. The lower end of plunger 51, however, terminates in a flat surface 52 adapted to shear a fuze wire 53 and thereby remove or disconnect power from the other switches as the plunger 51 is released and actuated to a release position by spring 43 associated therewith as shown on Fig. 10.

Figure 7:
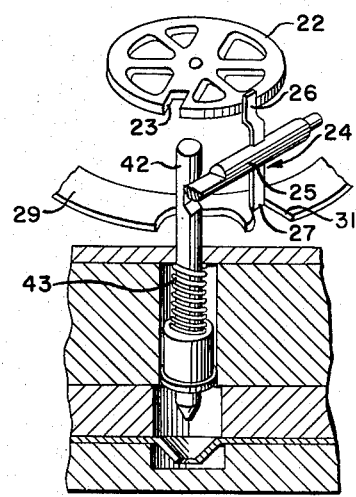
Fig. 7 is a diagrammatic view in perspective of one of the switches in an unoperated position and the release mechanism therefor.

The operation of the device will now be described. Let it be assumed, by way of example, that the disc 22 has been set by the fuze setter to a setting such that the first switch will be actuated 5 seconds after the projectile has left the muzzle of the gun, this setting being shown diagrammatically on Fig. 7. Let it also be assumed that the spring motor 16 has been wound and that the escapement mechanism is releasably locked by the inertia member. As the gun is fired, set-back force causes the inertia member to be suddenly moved rearwardly thereby releasing the escapement mechanism for operation. At the expiration of 5 seconds, in the assumed example, notch 23 of disc 22 has moved sufficiently to allow the portion 26 of the cam release element 24 to be disengaged from the circular surface of disc 22 and shaft 25 to be rotated by spring 43 of the associated switch mechanism to the position shown on Fig. 8 in which the element 24 has been rotated thru a 90 degree angle. When this occurs plunger 42 is suddenly moved downwardly to a position such that contact surface 48 thereof engages and electrically interconnects contact elements 54 and 55, Fig. 10. Closure of this switch applied battery to sonde oscillator 14 thereby causing an asymmetrical radio field to be set up about the nose of the projectile at a distance from the gun corresponding to 5 seconds of flight of the projectile.

Figure 4:
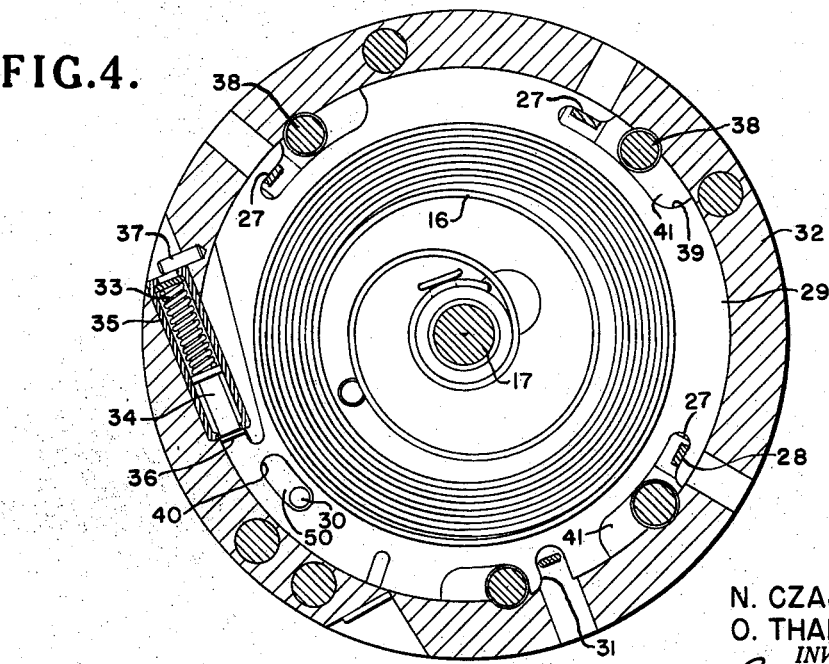
Fig. 4 is a view taken along the line 4—4 of Fig. 2 on which is shown the means for disabling all but one of the switches during a first revolution of the device.
Figure 8:
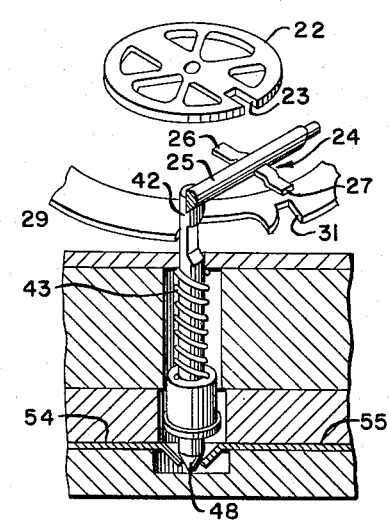
Fig. 8 is a view similar to Fig. 7 on which the switch is shown operated.
Figure 9:
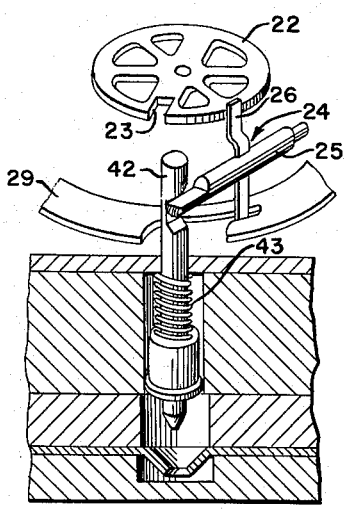
Fig. 9 is a diagrammatic view in perspective of another of the switches on which is shown the means for rendering the switch ineffective during a first revolution of the timing cam.

As the cam releasing element moves to the position shown on Fig. 8 the lower portion 27 thereof is disengaged from notch or slot 31 formed in locking ring 29, Fig. 4. When this occurs ring 29 is moved by the spring 33 to a release position such that the lower portions 27 of the remaining switch releasing mechanisms are free of restraint and the remaining switch mechanisms are thus rendered effective for operation as the notch 23 of disc 22 moves into registration with the upper portions 26 thereof in successive order.

It will be noted that the second switch to be operated by the program device of the instant invention is normally open and adapted to close its contacts a predetermined fixed period of time after the first switch has operated. This predetermined period of time may be in the order of 2.25 seconds at the expiration of which period, closure of the second switch applies battery to the sonde receiver 20 of the missile whereby the steering charge is fired in response to a signal from a ground or ship station to steer or alter the course of the projectile in the direction of the target. The terms "sonde oscillator" and "sonde receiver" as employed herein may be defined as the radio frequency oscillator and the radio receiver respectively employed with a projectile radio sonde system. The specific means employed for transmitting and receiving the radio signal for firing the steering charge form no part of the present invention and, therefore, are not described in detail. The third switch operated as the portion 26 of the associated cam releasing element 24 enters notch 23 of disc 22 causes the fuze element 53 thereof to be severed at a fixed predetermined interval of time such, for example, as 7.5 seconds after the first switch has operated, Fig. 11. When this occurs battery is removed from both the oscillator and receiver thereby rendering the oscillator and receiver ineffective in the event that the missile has not been destroyed by operation of the proximity fuze 13 carried in the tail portion thereof.

By controlling the oscillator and receiver in such manner that they are operative for predetermined short intervals at the completion of a closely controlled first time interval, the probability of air jamming by the enemy and a radio traffic jam by several missiles simultaneously in flight using the instant invention is greatly reduced.

In the event that the desired time interval between the discharge of the projectile from the muzzle of the gun and the closing of the first switch to turn on the receiver within the projectile should be in the order of 20 seconds, this is achieved by setting the disc 22 to the proper setting and employing an escapement mechanism having a rate of escapement such that the shaft 15 and disc 22 carried thereby rotate through substantially one complete revolution before the first switch is operated by movement of the end 26 of cam releasing element 24 into notch 23 of the timing disc. During the second revolution of the timing disc 22 the second and third switches are actuated in fixed time space relation as notch 23 is engaged by the associated cam releasing elements in successive order during the second revolution of the timing disc. Although notch 23 of disc 22 may move past the cam portions 26 of the cam releasing elements of the second and third switches during the first cycle or revolution of the disc, it will be understood that these switches did not operate during the first revolution by reason of a restraint placed on the lower portions 27 of the cam releasing elements by locking ring 29 at the latched portions 28 thereof which maintain the cam portions 26 is closely spaced adjacency with the circular portion of disc 22 and preferably out of contact therewith until the timing disc 22 has rotated sufficiently to cause the first switch to operate.

By employing two revolutions of timing disc 22 to control three switching functions in the manner disclosed, a high degree of precision and accuracy is obtained in the control of the time intervals delineated by the various switch operations. This feature of the invention assumes increasing importance with projectiles of smaller caliber such, for example, as a 4 inch projectile within which the timing disc 22 rotates. By employing two rotations of the disc for the operation of the various switching elements in lieu of one rotation heretofore employed, the peripheral rate of movement of the disc is doubled and the timing accuracy thus obtained is greatly improved. Furthermore, by employing the device of the instant invention in a projectile, the various switching functions occur at predetermined intervals corresponding to predetermined points along the trajectory of the projectile with a much smaller degree of error than has heretofore been achieved.

Obviously many modifications and variations are possible in the light of the above teachings. It is therefore to be understood that within the scope of the appended claims the invention may be practiced otherwise than as specifically described.

What is claimed as new and desired to be secured by Letters Patent of the United States is:

1. A program device of the character disclosed for operating a plurality of initially locked switches in predetermined time spaced relation comprising a rotatable shaft, a spring driven motor on said shaft for operating the shaft through two revolutions thereof, an initially locked escapement mechanism connected to said motor and operable thereby, means including an inertia element for releasing said escapement mechanism, a circular timing disc having a notch formed in the periphery thereof carried by said shaft and settable to different settings with respect thereto, the first one of said switches to be operated being initially locked by the periphery of said disc until the disc has moved sufficiently for the notch to be engaged thereby, means for setting said disc to a setting corresponding to the interval of time between the release of said escapement mechanism and the first one of said switches to be operated, means normally locking all but the first operated one of said switches in an initial unoperative position, means including said notch one said disc for unlocking said first one of said switches at the expiration of said predetermined interval of time, means including a movable locking ring controlled by the first named switch locking means for releasing all but the first one of said switches as said first one switch is operated, and means including said notch and controlled by said locking ring for causing operation of all but said first one switch in predetermined time space sequence during a second revolution of said disc after said first one switch has operated.

2. A device of the character disclosed for operating a plurality of switching elements in successive order at predetermined intervals of time comprising a circular timing disc having a notch in the periphery thereof, means for rotating said timing disc at a uniform rate through more than one complete revolution thereof, means including a pivoted latch normally locked by the periphery of said disc in spaced relation to said notch for operating one of said switches during the first rotation of said disc as the latch enters said notch at a predetermined interval of time after the disc started to rotate, an annular spring urged locking member movable from an initial locking position to a released position and controlled by said latch and having means for engaging and preventing operation of all but said one of the switches during said first rotation of the timing disc, said last named means being normally locked by said first switch and releasing all switches but said first switch for operation as the first switch is operated, and means including a plurality of adfditional pivoted latches respectively connected to all switches except said first switch for actuating all switches except the first switch during a second revolution of the timing disc in predetermined time sequence as the additional latches enter said notch in successive order.

3. A timing mechanism of the character disclosed for use with a projectile comprising a spring driven escapement mechanism, a projectile within which the timing mechanism is disposed, inertial means actuated by setback force for releasing said escapement mechanism in response to set-back force as the projectile is fired from a gun, a circular timing disc having a notch on the periphery thereof, means for setting said disc to a predetermined setting, a plurality of cam followers disposed about said disc and adapted to be moved from a position at the periphery of the disc through said notch to a release position as the notch is brought into registry therewith, a plurality of rotatable shafts corresponding in number to the number of said cam followers for supporting the cam followers for pivotal movement thereabout, a plurality of switching elements operatively connected to said shaft in a manner to impart rotative movement thereto and be released therefrom when the shaft has rotated through a 90 degree angle, an annular member movable from a first position to a second position, resilient means for imparting rotative movement to said annular member, means carried by one of said shafts for locking the annular member in said first position until said one shaft has rotated, means on said annular member for preventing rotation of the remaining shafts until the annular member has moved to said second position, and a plurality of switches respectively connected to a respective one of said shafts and operated in predetermined time sequence as the shafts are rotated about their axes in successive order.

4. The mechanism according to claim 3 in which each of said shafts is provided with a flat bearing surface coincident with the axis of rotation thereof and each of said switches includes a plunger having a notch formed therein for engagement with a portion of said bearing surface to provide rotary movement of the shaft as the associated cam follower is engaged by the notch in said disc.

5. The device according to claim 4 in which means are provided for yieldably urging the plunger in a direction to rotate said shaft.

6. The device according to claim 5 in which at least one of said plungers is provided with a conical contact surface at one end thereof and at least one of the switches comprises two mutually spaced contact elements electrically connected by said contact surface as the switch operates.

7. The device according to claim 4 in which the plunger of the last one of the switches to be operated in sequential order is provided with a flat surface at one end thereof, and a fuse wire disposed within the path of travel of said plunger and adapted to be sheared by said surface as the plunger is released therein.

8. A program device of the character disclosed for use with a projectile in flight comprising, in combination, a circular timing cam having a notch in the periphery thereof, means for rotating said cam at a uniform rate through two revolutions thereof during the flight of said projectile, a cam follower engageable by said notch, a switch controlled by said timing cam and follower for operation during a first revolution thereof, a plurality of additional cam followers engageable in successive order by said notch and a plurality of additional switches controlled by said timing cam and additional followers and adapted to be operated in predetermined sequential order during a succeeding revolution thereof.

9. A device according to claim 8 including a radio oscillator connected to the first one of the switches operated during said flight and set into operation as the first named switch is closed.

10. A device according to claim 9 including a radio receiver connected to the first one of said switches to be operated during the second revolution of said timing disc and set in operation thereby as said one of the switches operates.

11. A split second timer for use within the shell of a projectile in flight comprising, in combination, an adjustable rotatable timing control element, means for rotating said element at a constant rate from an initial position of rest through two revolutions thereof during the flight of a projectile along a trajectory, a normally open spring biased switch means, means on said timing element for effecting closure of said switch means when the element has moved through a selected angle of rotation from said position of rest during the first revolution thereof, at least one additional spring biased normally open switch means, the closure of which is effected by said switch closure means during the second revolution of said timing element in predetermined time delayed relation to the closure of said first named switch means, and means on said timing control element for preventing the closure of said additional spring biased normally open switch means during the first revolution of the timing control element.

12. A timer according to claim 11 including means operable at will for setting the adjustment of said timing control element such that the initial position of rest thereof is at a selected angle of rotation from the instant position of the switch closing means as the first named switch means is closed.

13. A timer according to claim 11 including means controlled by said first named switch means for preventing closure of said additional switch means during the first revolution of said timing element.

References Cited in the file of this patent

UNITED STATES PATENTS

| | | |
|---|---|---|
| 2,060,198 | Hammond | Nov. 10, 1936 |
| 2,112,654 | Lux | Mar. 29, 1938 |
| 2,410,724 | Elliott | Nov. 5, 1946 |
| 2,411,788 | Hammond | Nov. 26, 1946 |
| 2,438,438 | Hammond | Mar. 23, 1948 |
| 2,547,960 | Montgomery | Apr. 10, 1951 |
| 2,593,775 | MacLean | Apr. 22, 1952 |
| 2,642,801 | Gleason | June 23, 1953 |
| 2,826,991 | Beach | Mar. 18, 1958 |